Sept. 15, 1953

J. R. ALBURGER 2,652,536

RADIO BROADCAST SYSTEM

Filed July 7, 1950

INVENTOR.

James R. Alburger

Patented Sept. 15, 1953 2,652,536

UNITED STATES PATENT OFFICE 2,652,536

RADIO BROADCAST SYSTEM

James R. Alburger, Los Angeles, Calif.

Application July 7, 1950, Serial No. 172,621

1 Claim. (Cl. 332—18)

Figure 1:
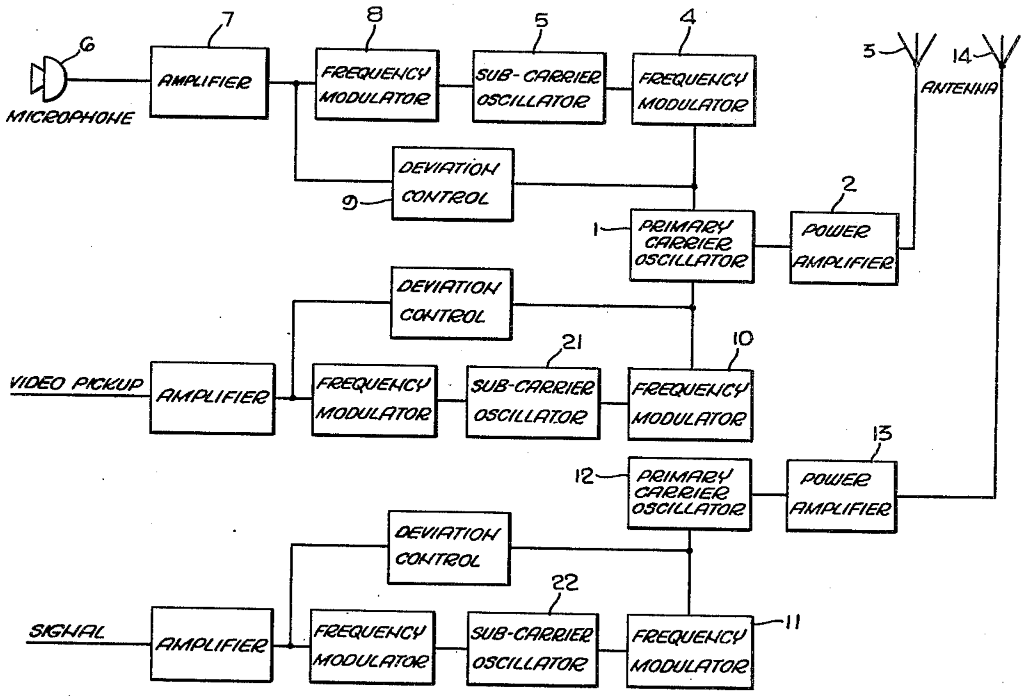

With the rapid increase in the number of radio broadcast and television stations, the usable radio spectrum is becoming greatly overcrowded. Television transmitters, due to the high modulating frequencies employed, occupy relatively broad portions of the spectrum with the result that available space in allotted wavelength bands is already used up and there is no room left for several hundreds of television broadcast transmitters which even now have applications on file for broadcast licenses.

This condition of overcrowding has been the subject of urgent attention for quite some time, and many attempts have been made to develop systems which would permit the introduction of a larger number of broadcast stations on the air simultaneously without interference. Three important steps in this direction have been as follows. One method, carrier synchronization operation, involves the control of two or more television transmitters by means of a monitor placed between the stations so as to effectively lock the transmitted signals to zero-beat. With the signals locked together in this way, interference of the type known as Venetian-blind effect is removed. However, interference effects still become objectionable when the level of the interfering signal from the unwanted station becomes high.

A second method, known as carrier-offset operation, involves purposely separating the carriers of co-channel television stations by 10.5 kilocycles. This relatively high beat frequency creates a large number of Venetian-blind bars in the received picture with the result that the interference bars blend to a neutral gray. Here again, interference may become objectionable when the signal level of the unwanted station becomes high.

Improved efficiency in the use of available bands has been achieved by means of the so-called vestigial sideband system. In this third method, the lower sideband of the video signal is attenuated. The picture detail is only slightly affected due to the fact that the upper sideband is received in its entirety, plus the fact that some equalization of the lower sideband attenuation takes place in the receiver. By this means, a saving is effected in the band width used for a given transmission.

The introduction of color into television broadcast systems promises to further complicate the overcrowding of broadcast channels, and it has become apparent that all methods tried thus far have fallen short of an adequate solution to the problem.

Extension of the frequency spectrum toward the ultra-high frequencies is limited due to the physical dimensions of circuit components and the inability of available equipment to deliver adequate radiated power. Unless the industry is prepared to go to narrow-beam transmission or transmission over wires or other conductors, it appears obvious that some means will have to be devised to actually superimpose signals on top of one another without apparent interference.

One object of my invention is to provide a means for superimposing radio broadcast signals in such a way as to avoid or minimize interference. Other and incidental objects of my invention will be apparent from a reading of the following specification.

I have discovered a useful relationship in the frequency modulation of a radio broadcast transmission and a method of utilizing this relationship which makes it possible to superimpose a multiplicity of intelligence modulations while avoiding interference between the various intelligence modulations.

A frequency modulated wave is expressed as a Bessel function equation developed from $$y=A\sin\int_0^t \omega dt$$

The wave equation developed from the above relationship is

| | |
|---|---|
| $y=AJ_0(\alpha)\sin\omega_0 t$ | carrier |
| $-AJ_1(\alpha)[\cos(\omega_0+\omega_m)t]$ | first upper side frequency |
| $-AJ_1(\alpha)[\cos(\omega_0-\omega_m)t]$ | first lower side frequency |
| $-AJ_2(\alpha)[\sin(\omega_0+3\omega_m)t]$ | second upper side frequency |
| $-AJ_2(\alpha)[\sin(\omega_0-2\omega_m)t]$ | second lower side frequency |
| $+AJ_3(\alpha)[\cos(\omega_0+3\omega_m)t]$ | third npper side frequency |
| $+AJ_3(\alpha)[\cos(\omega_0-3\omega_m)t]$ | third lower side frequency |
| $+\cdots\cdots\cdots$ | |

In the above equation, the J functions are Bessel coefficients which can be found from tables of higher functions, and $y$=instantaneous amplitude
$A$=peak amplitude
$\omega_0=2\pi f_0$
$\omega_m=2\pi f_m$
$f_0$=carrier frequency
$f_m$=modulating frequency
$t$=time
$\alpha$=a phase angle $$\frac{\Delta\omega_0}{\omega_m}$$

$\Delta\omega_0$=deviation of the carrier frequency

If the phase angle $\alpha$ is held constant, then the energy content of the carrier and therefore its amplitude must remain constant. I have found a way to make use of this relationship whereby it is possible to apply two or more sets of modulation frequencies to the same carrier without interference. The method I use is as follows:

A primary carrier $f_0$ is frequency modulated with a frequency $f_m$ and at a deviation $\Delta f_0$. This frequency $f_m$ is used as a secondary carrier and is frequency modulated by the intelligence frequency $f_\mu$, while the deviation $\Delta f_0$ is simultaneously modulated by the intelligence frequency $f_\mu$ (by means of a reactance tube or equivalent) to a secondary deviation $\Delta\Delta f_0$. The magnitude and direction of this secondary deviation is adjusted by proper setting of the level input to the reactance tube (or equivalent) so as to balance variations in $\alpha$ to zero. The proper balance point is obtained when switching on and off of the secondary modulation shows no change in amplitude of the primary carrier.

Figure 2:
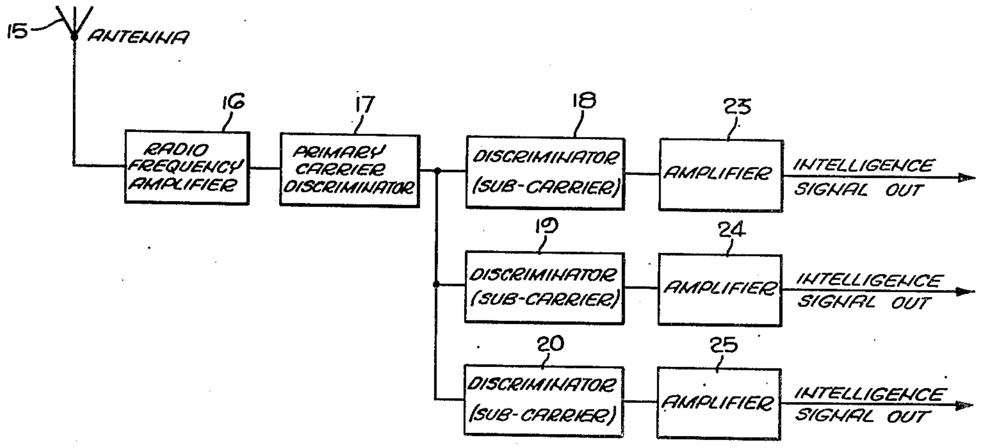

Fig. 1 of the accompanying drawing is a block diagram of a transmitting system according to the invention; and Fig. 2 is a block diagram of a receiving system to be used with the transmitter of Fig. 1.

Referring to Figure 1 in the drawing, a primary carrier signal is produced by oscillator 1. This signal is amplified in a conventional manner by a power amplifier stage 2 and delivered to a transmitting antenna 3. The primary carrier signal is frequency modulated by a modulating stage 4 controlled by a secondary carrier oscillator 5. A secondary carrier as used in this specification is also known as a sub-carrier, and its frequency is necessarily less than that of the primary carrier. The frequency of the secondary carrier may be arbitrarily selected and the deviation or degree of frequency modulation of oscillator 1 by modulator 4 may also be arbitrarily selected.

At this point in the description, all conditions indicated are steady state conditions, no intelligence frequencies having been introduced. Intelligence frequencies are shown in the drawing as being picked up by microphone 6, although such frequencies might also be derived from a keying device or even a video pickup tube. The intelligence frequencies are amplified by amplifier 7 and applied through modulator 8 to frequency modulate the secondary carrier oscillator 5. Naturally, the frequency applied through modulator 8 will vary over the entire range of intelligence frequencies, and the deviation or degree of modulation of oscillator 5 will depend on the amplitude of the intelligence signal.

When oscillator 5 is frequency modulated by the intelligence frequencies, a variation is introduced in the frequency applied through modulator 4 on primary oscillator 1. In conventional sub-carrier systems, this variation is transmitted to the antenna 3 without further control, the result being that the amplitude of the primary carrier varies in accordance with the applied intelligence frequencies. It is apparent that if the deviation of the primary carrier signal produced by modulator 4 is kept relatively constant as is conventional practice in sub-carrier systems, any variation in the frequency applied through modulator 4 must necessarily alter the amplitude of the primary carrier frequency. It is seen in the wave equation for a frequency modulated wave that the instantaneous amplitude of the carrier frequency is expressed by;

$$y=AJ_0\left(\frac{\Delta\omega_0}{\omega_m}\right)\sin\omega_0 t$$

The introduction of any variation in the modulating angular velocity $\omega_m$ will of course alter the amplitude $y$ unless there is a simultaneous compensating variation in the deviation $\Delta\omega_0$ so as to maintain the ratio $$\frac{\Delta\omega_0}{\omega_m}$$

constant.

The compensating variation in the deviation of the primary carrier which I desire in my system is produced by means of deviation control 9. Part of the intelligence signal from amplifier 7 is impressed on deviation control 9 which may consist of a reactance tube or equivalent network. Deviation control 9 serves to alter the degree of frequency modulation of the primary carrier in accordance with the instantaneous amplitude of the intelligence signal from amplifier 7. This deviation control is super-imposed on the modulation conditions established by modulator 4 and the amount of control introduced from control 9 is adjusted to the point where variations in amplitude of the primary carrier are balanced substantially to zero. It is pointed out that there are various ways of introducing the aforesaid deviation control, one method being the use of a variable reactance network which serves to control and vary the frequency of the primary oscillator 1. I do not restrict my invention to any specific circuit arrangement for providing the desired deviation control.

Additional intelligence signals may be introduced on the broadcast carrier by means of additional modulators such as modulator 10 controlled by oscillator 21. The added channels would be substantially the same as the channel including elements 4 to 9 inclusive, and the modulations produced would be impressed on the primary carrier in such a manner as to leave the amplitude of the primary carrier unaltered.

An entirely separate transmitter may be operated on the same carrier frequency as that of oscillator 1. In such a separate transmitter, oscillator 12 delivers a signal through amplifier 13 to antenna 14. Oscillator 12 is modulated by means of modulator 11 controlled by oscillator 22 and by means of a channel containing elements similar to elements 4 to 9 inclusive. As before, the amplitude of this separate transmitter carrier is maintained substantially constant. The various sub-carrier frequencies 5, 21, and 22 are kept far enough apart so that they can be separated in a receiver discriminator.

It will be seen from the foregoing that I have combined a sub-carrier frequency modulating system with a direct frequency modulating system in such a way that the transmitted carrier frequency remains constant in its amplitude at all times. The advantage of this will be apparent from the following description.

With a multiplicity of intelligence modulations being transmitted on the same primary carrier frequency in accordance with a sub-carrier system, a conventional FM receiver will be unable to discriminate or separate the various sets of intelligence. However, a sub-carrier type receiver will be able to separate the desired signals. Receivers of this type are well known and I do not, therefore, include a receiver as an element in my invention. However, for purposes of clarity a receiver system is indicated in Figure 2.

The received signal enters from antenna 15 and is amplified by R. F. amplifier 16. Discriminator 17 is tuned to the primary carrier frequency of the incoming signal and serves to detect this frequency and its associated modulations. Discriminators 18, 19, and 20 are tuned respectively to secondary carriers (sub-carriers) 5, 21, and 22. These secondary discriminators serve to separate and detect the various intelligence modulations, delivering these intelligence signals through amplifiers 23, 24, and 25 to appropriate outputs such as loud speakers, video output tubes or various kinds of control circuits.

A receiver discriminator serves the function of translating a pattern of carrier and modulation frequencies into intelligence frequencies. It is obvious that if the carrier fluctuates or varies its amplitude in accordance with an undesired signal, the undesired signal will appear in the output of the receiver. By maintaining the amplitude of the broadcast or primary carrier substantially constant in accordance with my invention, no variations in carrier amplitude are introduced and therefore cross-talk or interference between sub-carriers is minimized or eliminated.

I have named my new modulation system a "multiple secondary carrier system of broadcast transmission." Since my system can be utilized on code, voice, television or any other type of intelligence desired to be transmitted, I make no restriction as to the application of my method. In addition, I make no restriction as to the frequencies employed either as primary carriers, secondary carriers, or intelligence, my only restriction being that the alpha ($\alpha$) of the primary carrier modulation must be held substantially constant.

With a primary carrier $f_0$ is modulated at a steady state condition with a given modulation frequency $f_m$, $\alpha$ is constant and the amplitude of the carrier depends on $J_0(\alpha)$, where this Bessel function can vary between +1, 0, and −1, according to the value of $\alpha$, or the ratio of the deviation of the primary carrier ($\Delta f_0$) to the modulating frequency ($f_m$). It is seen therefore that it is even possible, if desired, to so establish the conditions of modulation that the primary carrier vanishes. The constant value of amplitude of the primary carrier, be it zero or otherwise, may be maintained by keeping $\alpha$ to a constant value. Since $\alpha$ is merely the ratio of two factors, the deviation of the primary carrier ($\Delta f_0$) and the modulating frequency ($f_m$), $\alpha$ can be held constant during variations of the modulating frequency $f_m$ by making suitable compensation in the deviation $\Delta f_0$ of the primary carrier. Accordingly, when I introduce intelligence frequencies $f_\mu$ as a modulation of $f_m$, I make suitable compensation in $\Delta f_0$ by simultaneously modulating the deviation $\Delta f_0$, adjusting the circuit constants so as to maintain the desired constancy of $\alpha$.

In as much as the modulations of the primary carrier by the secondary carrier frequency, and the modulations of the secondary carrier frequency by intelligence frequencies, and the modulations of the deviation of the primary carrier by intelligence frequencies can be introduced in a variety of well known ways, and in as much as the control over the relative modulations can be effected in a variety of well known ways so as to hold constant the alpha ($\alpha$) of the primary carrier modulation, I make no restriction in my method as to the exact electrical circuits employed for this purpose, my only restriction being that the alpha ($\alpha$) of the modulation of the primary carrier $f_0$ be held substantially constant under all conditions of intelligence modulation.

In operation, with a primary carrier frequency modulated by several secondary carriers, and with each secondary carrier frequency modulated by a separate set of intelligence frequencies, and with the alphas of the modulations of the primary carrier held constant in accordance with my method, then the amplitude of the primary carrier will at all times be constant, and demodulation of the several sets of intelligence frequencies (by means of a compound discriminator) in the receiver will result in freedom from apparent interference.

Due to the nature of frequency modulated systems, the presence of additional primary carriers within the channel encompassing the multiple secondary carrier system do not create interference since the beat frequencies produced do not pass through the receiver discriminator (assuming that the discriminator circuit is properly balanced and limited to exclude amplitude modulated signals).

Having thus described my invention, I claim:

A signal transmission system comprising a primary carrier wave source, a sub-carrier wave source, means for frequency modulating the primary carrier wave by said sub-carrier waves, a source of intelligence waves, means for frequency modulating the sub-carrier wave by said intelligence waves, and means for modulating the deviation of said primary carrier wave in accordance with said intelligence waves, the amplitude and phase of the last said modulation being adjusted so as to maintain substantially constant the ratio of the primary carrier frequency deviation to the instantaneous frequency of the sub-carrier.

JAMES R. ALBURGER.

References Cited in the file of this patent

UNITED STATES PATENTS

| Number | Name | Date |
|---|---|---|
| 2,233,183 | Roder | Feb. 25, 1941 |
| 2,421,727 | Thompson | June 3, 1947 |
| 2,468,038 | Clavier | Apr. 26, 1949 |